Jan. 15, 1946.  L. R. BUCKENDALE  2,392,832
DRIVE AXLE
Filed Jan. 6, 1943  4 Sheets-Sheet 1
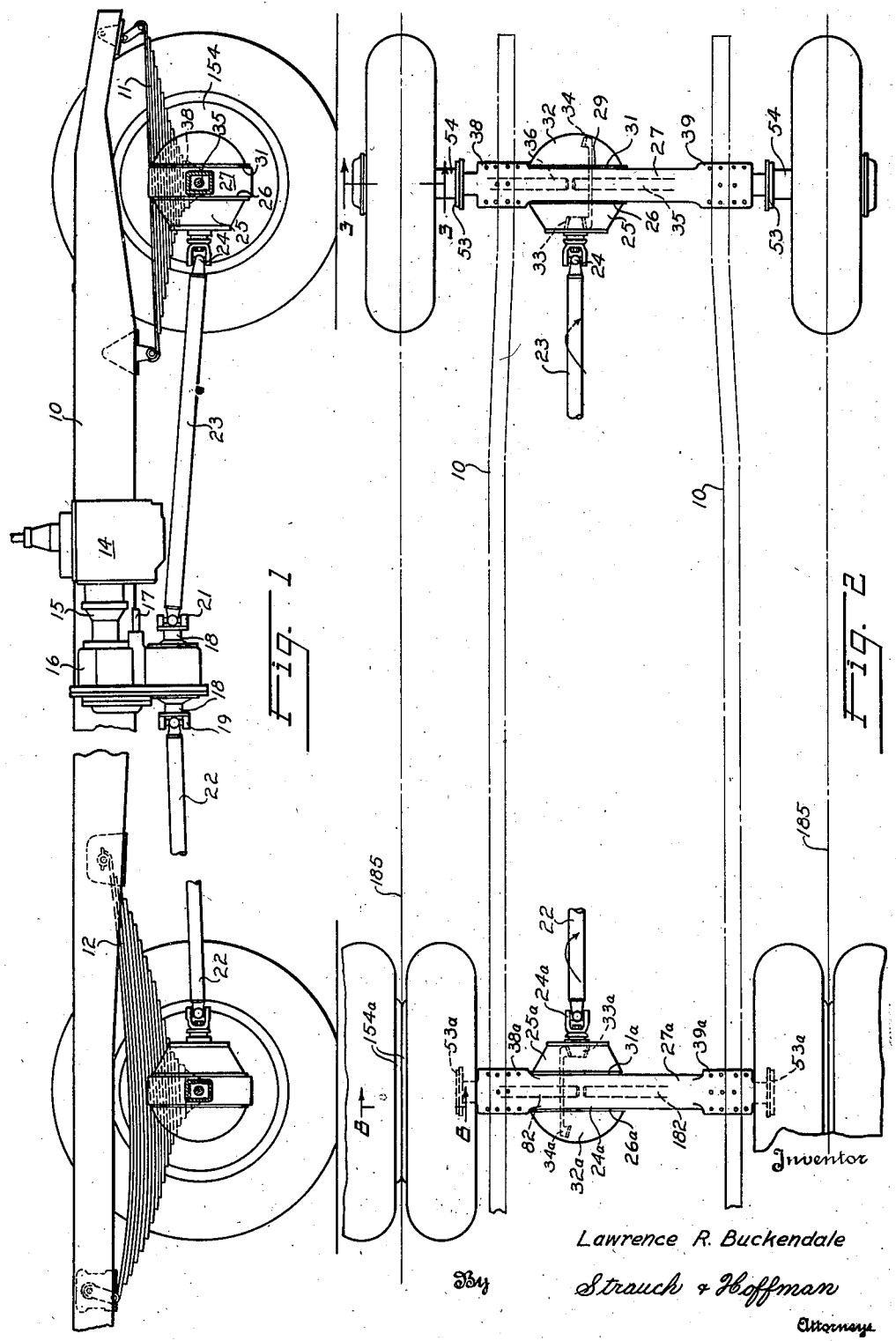
Inventor
Lawrence R. Buckendale
By Strauch & Hoffman
Attorneys

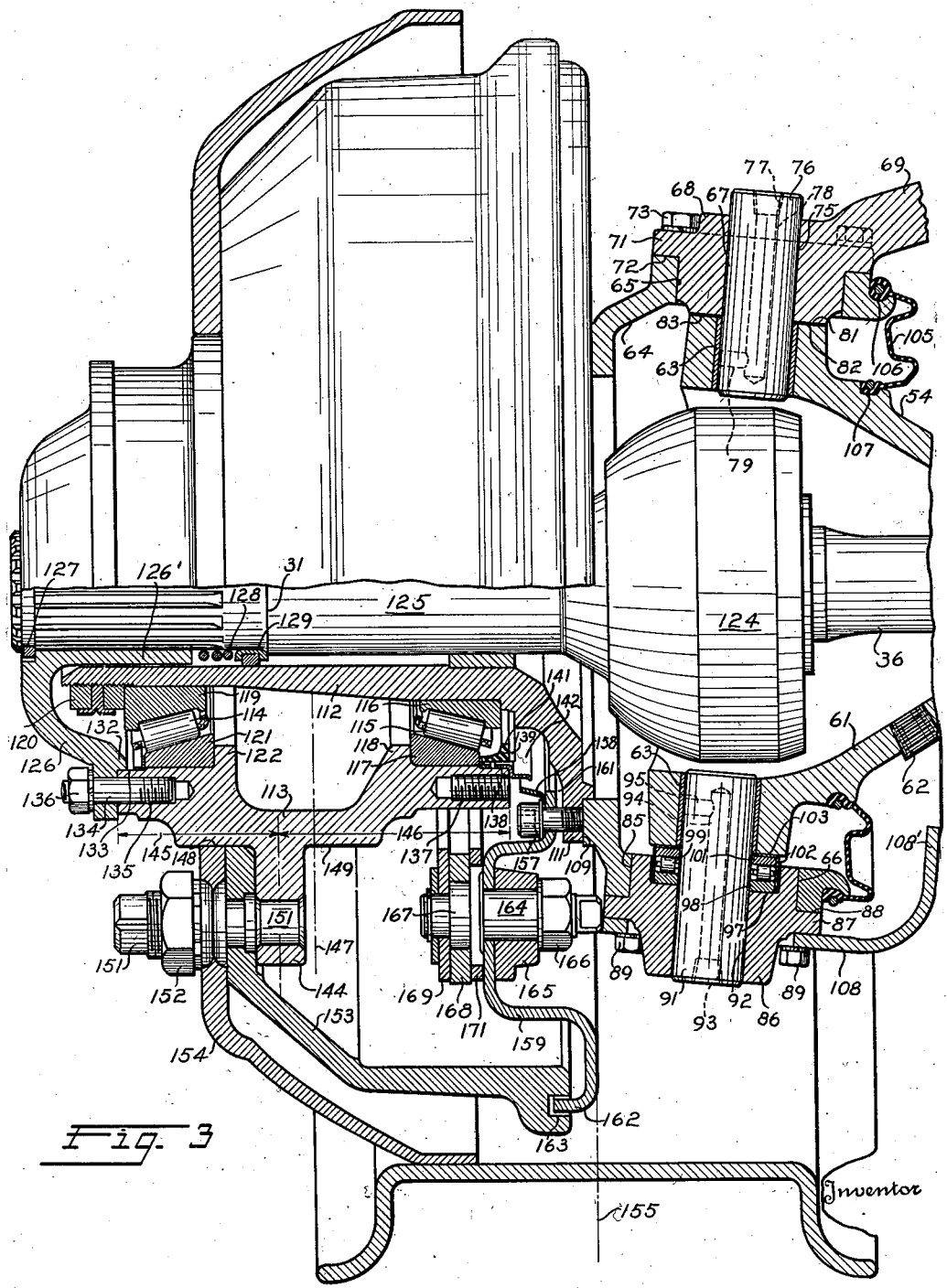

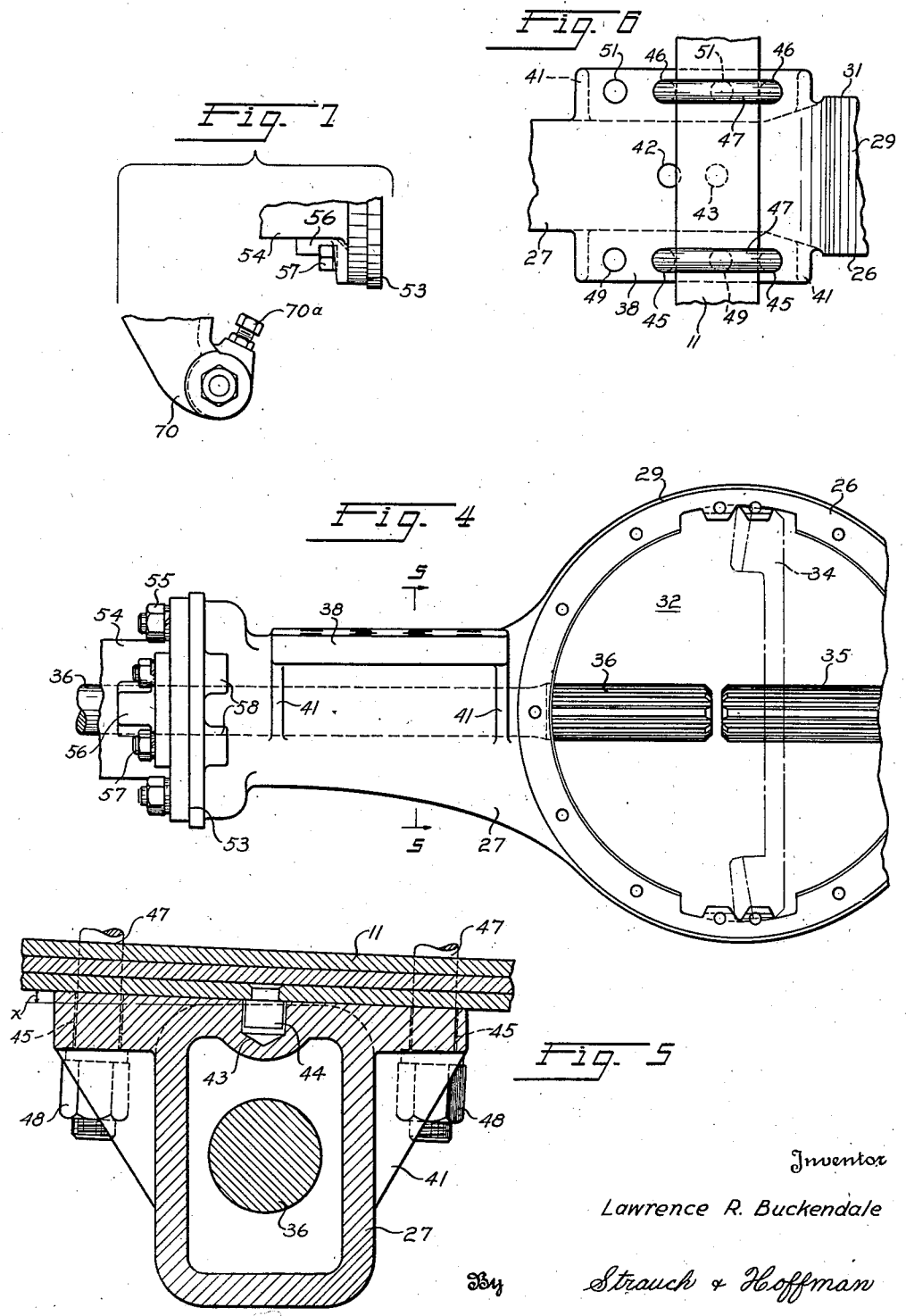

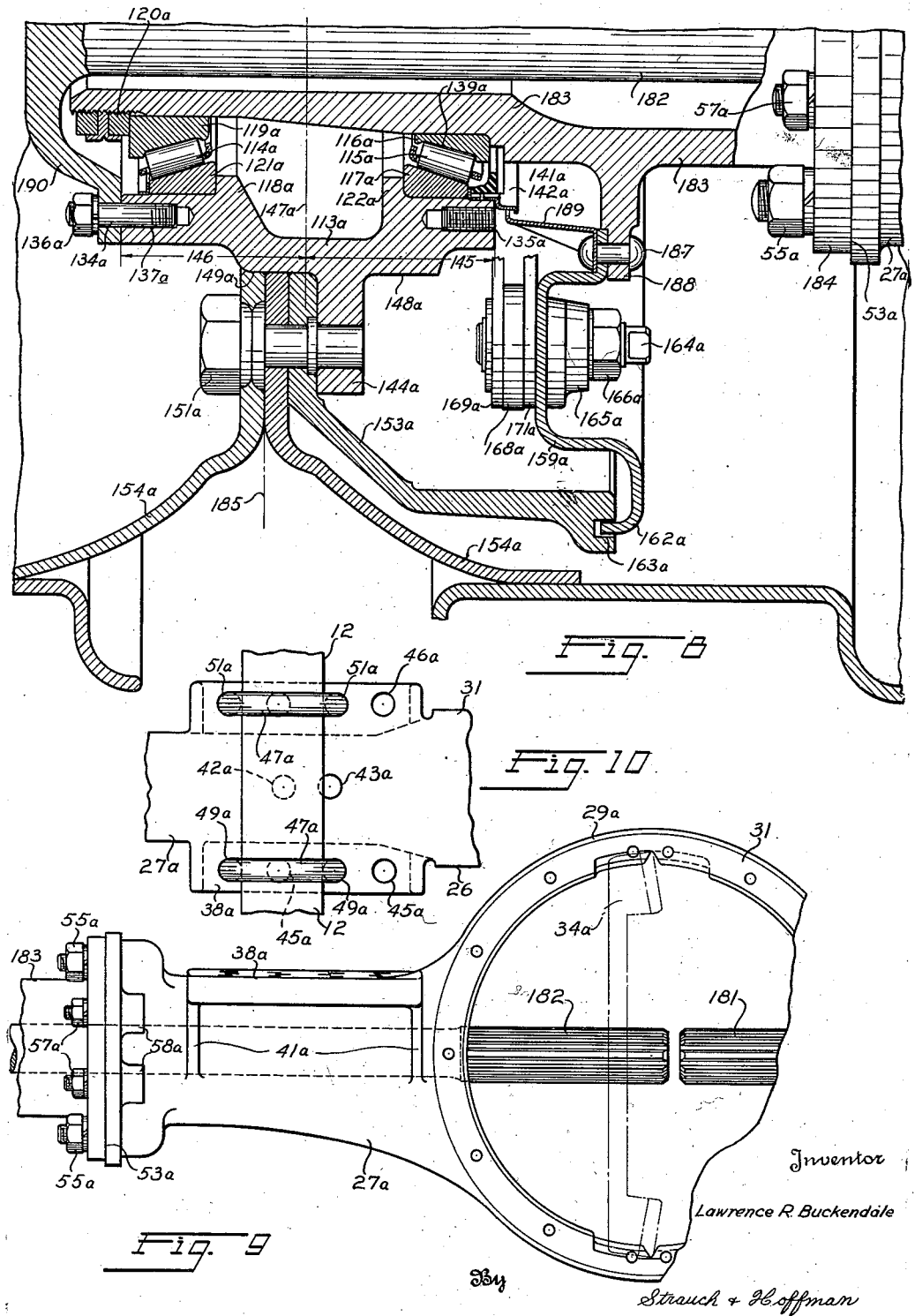

Patented Jan. 15, 1946

2,392,832

UNITED STATES PATENT OFFICE 2,392,832

DRIVE AXLE

Lawrence R. Buckendale, Detroit, Mich., assignor to The Timken-Detroit Axle Company, Detroit, Mich., a corporation of Ohio Application January 6, 1943, Serial No. 471,494

12 Claims. (Cl. 180—44)

The present invention relates to drive axles, particularly drive axles for four and six wheel drive vehicles, although it is not limited to such use.

The drive axles heretofore proposed for use in four and six wheel drive vehicles have been so designed and constructed that the front drive axle is of totally dissimilar design than the rear drive axle, with the result that it is impossible to use any of the front drive axle parts in the rear axle, or to employ any of the rear axle parts in the front axle, with the possible exception of the wheels. This not only materially adds to the cost of manufacture, but also makes it necessary for servicing organizations to stock a complete line of parts for each axle. This lack of interchangeability of parts of the front and rear axles heretofore proposed has also led to serious difficulties in the field, by keeping trucks out of service until the proper front or rear axle replacement part had been obtained, even though a complete stock of parts for the other axle may have been available.

I have found that by providing an axle housing having a bowl portion providing front and rear bolting faces, each designed to interchangeably support a carrier or a bowl cover, and providing the housing with end bolting faces spaced apart a predetermined distance, providing spring seats of special form to properly center and anchor either front or rear springs; and providing front steering drive end assemblies made up of auxiliay housings adapted to be secured to the housing end bolting faces, and a pair of spindle assemblies mounted for steering movement on the auxiliary housings, each carrying a hub and wheel assembly, and providing rear drive end assemblies each made up of a spindle adapted for direct bolting to the housing end bolting faces and carrying a hub and front wheel assembly, it is possible by properly proportioning the parts, to successfully utilize the axle housing for either a front or rear axle by bolting a carrier to one of the bowl portion bolting faces and bolting the appropriate end assemblies to the end bolting faces of the housing.

I have also discovered that by providing the steering drive end assemblies just described with inverted Elliot trunnion mountings of novel form, for amply supporting the spindles in stable manner to adequately resist the shear with plain bearings, it is possible to employ front spindles of such design that they will take hubs which are interchangeable with the hubs of the rear drive end assemblies, and also, by reversing the hubs end-for-end, the track may be varied. The trunnion and spindle design just described also makes it possible to employ interchangeable front and rear brake drums and brake mechanisms, and the hub and spindle also accommodate bearing assemblies that are fully interchangeable front and rear.

It is accordingly the major object of the invention to provide novel front and rear drive axles which are so designed that many of the parts of the front axle are fully interchangeable with corresponding parts of the rear axle, thereby simplifying and materially reducing the cost of manufacture, and greatly facilitating servicing of four and six wheel drive vehicles.

A further important object is to provide a novel trunnion mounting for an inverted Elliott type steering drive spindle, embodying trunnion pins rigidly carried by the spindle in such manner as to adequately take the load in shear in plain bearings in the axle housing, and yet the pins are readily detachable to permit disassembly of the spindle from the housing.

A further object is to provide a novel axle housing embodying spring pad assemblies which are so designed as to interchangeably support either front or rear springs, with the respective springs spaced different distances from the centerline of the axle.

Another object is to provide a novel wheel hub which may be installed in one position on the spindle to afford one value of wheel tracking and may be installed in another relationship to the spindle to give a different tracking.

Further subordinate objects are to provide an improved steering drive axle stop assembly; novel grease slinger assemblies for preventing ingress of lubricant to the brake drum; a novel trunnion bearing assembly; an improved guard device for protecting the sealing boots of steering drive axles; and to provide further axle improvements and refinements to be hereinafter pointed out.

Further objects will become apparent as the specification proceeds in conjunction with the annexed drawings, and from the appended claims.

In the drawings:

Figure 1 is a vertical longitudinal sectional view through a vehicle chassis embodying the novel front and rear drive axles of the invention;

Figure 2 is a top plan view of the chassis and axle construction illustrated in Figure 1, the transmission transfer case and springs being omitted to simplify the disclosure;

Figure 3 is a vertical sectional view through the left-hand end of the front axle taken along the line 3—3 of Figure 2, parts of the structure being shown in elevation to simplify the disclosure;

Figure 4 is a fragmental side elevational view of the front axle shown in Figures 1 and 2 as it appears when viewed from a point just behind the axle, with the gear carrier and spring removed, the bevel ring gear being illustrated in phantom lines;

Figure 5 is a fragmental sectional view taken along the line 5—5 of Figure 4, and additionally illustrates the front spring in place on the spring pad and the anchoring clips or U-bolts;

Figure 6 is a fragmental top plan view of the structure illustrated in Figure 5;

Figure 7 is a fragmental top plan view illustrating the manner in which the stop screw on the steering arm cooperates with the stop bracket on the front axle housing;

Figure 8 is a vertical sectional view through one of the ends of the rear axle of the invention, taken substantially on the line 8—8 of Figure 2, the tires being omitted to simplify the disclosure;

Figure 9 is a view similar to Figure 4, but illustrates the left-hand end of the rear axle; and, Figure 10 is a top plan fragmental view of the spring pad structure shown in Figure 9, and additionally shows the rear spring in place on the spring pad, and the anchoring clips.

With continued reference to the drawings, in which like reference characters have been employed to designate like parts throughout the several views thereof, the invention has been illustrated as embodied in a four wheel drive vehicle having longitudinal chassis frame members 10, to which front and rear springs 11 and 12, respectively, are shackled in conventional manner.

A conventional selective speed transmission 14 derives power from the vehicle engine in well known manner and transmits it through a coupling 15 to a transfer case 16. The transfer case may be of any suitable design and preferably includes a low ratio and a high ratio, controlled by a shifter rod 17, for transmitting power to an output shaft assembly 18, which extends through opposite walls of the case and carries universal joints 19 and 21, which are connected to propeller shafts 22 and 23, respectively.

The structure just described is more or less conventional in present day four-wheel drive vehicles, but, as previously indicated, propeller shafts 22 and 23 are usually coupled to front and rear drive axles of totally different designs, in which substantially none of the parts of the rear axle correspond to, or are interchangeable with, any parts of the front axle.

I have found that by providing a center drive axle housing section terminating at its ends in bolting faces normal to the axis, providing novel spring pads for interchangeably receiving either the front or rear springs of a vehicle, providing a pair of front drive end sections each made up of a short auxiliary housing adapted to be bolted to the axle bolting face and each pivotally carrying a wheel supporting spindle assembly for steering movement on the auxiliary housing; and also providing a pair of rear axle end sections each made up of a spindle adapted to be rigidly secured to housing bolting flanges, and having a rear wheel carrying hub journalled thereon; and by so designing the bowl portions of the axle that a gear carrier assembly may be bolted to either the front or rear face thereof, thoroughly practical, low cost front and rear axles may be built up out of parts, of which many are interchangeable with the front and rear axles. Also, by providing a novel inverted Elliot type trunnion mounting, in which the required shear is taken in plain bearings, a spindle and hub assembly may be utilized in which it is possible to interchange the brake drum and brake mechanism of the front and rear axles, and to also utilize a hub which may be installed in one position in the front axle or be reversed and successfully installed in the rear axle.

Taking up the construction of the front axle first, coupled to propeller shaft 23 by means of a universal joint 24, is a gear carrier 25 which is secured to a bolting face 26 of axle bowl portion 29 by cap screws 28, in well known manner. As seen in Figures 2 and 4, bowl portion 29 of axle housing 27 is offset one side of the centerline of the axle, and while this construction is preferred, as it permits the front propeller shaft and front axle bowl to be disposed to one side of the engine, it is to be understood that the invention is not limited to axles having offset bowls.

An exactly similar bolting face 31 is provided on the front of the axle bowl portion, and a cover 32 is secured thereto in well known manner. As will be point out hereinafter, the same axle center section may be used in a rear axle, when the gear carrier 25 and cover 32 are reversed, and different housing end sections are used.

Carrier 25 rotatably supports meshing pinion 33 and bevel ring gear 34 in well known manner, and a differential (not shown) divides the power between long and short front axle shafts 35 and 36, respectively.

As seen in Figure 2, a pair of spring pads or seats 38 and 39 are integrally formed on housing 27, pad 38 being located closely adjacent the bowl and pad 39 being located remote therefrom. Since both the pads are of identical construction except that one is right-handed and the other left-handed, only pad 38 will be described in detail. Referring to Figures 4, 5 and 6, the pad is preferably provided with integral reinforcing webs 41, which merge into the side walls of the housing. As seen in Figure 6, pad 38 is provided with two spring centering recesses 42 and 43.

Front axle spring 11 has a dowel 44 seating in recess 43, which accurately centers it with respect to two pairs of U-bolt openings 45 and 46 in the spring pad. The spring is secured in place on the pad by means of a pair of anchoring clips or U-bolts 47, and nuts 48 in well known manner.

As seen in Figure 5, the upper surface of the spring pad slopes downwardly and rearwardly with respect to the horizontal plane at an angle X, preferably in the order of 2° 30', for the purpose of producing a similar degree of caster in the front axle trunnions.

A second pair of U-bolt openings 49 and 51 are also provided in spring seats 38 and cooperate with centering recess 42 to properly locate a rear spring on the axle housing when it is employed as a rear axle housing, as will be hereinafter pointed out.

Axle housing 27 terminates at each end in an enlarged portion providing a bolting face 53, to which flanged auxiliary housing sections 54 are secured by stud and nut assemblies 55. Since the ends of the axle are identical in construction, only one of them, namely, the left-hand front end assembly, will be described in detail. A steering arm stop pad 56 is secured to the flange of housing 54 by means of a pair of stud and nut assemblies 57, the studs being threaded into bosses 58 provided in housing 27, and also assisting in maintaining the two housing sections in rigidly assembled relationship.

Referring now to Figure 3, in which the details of the outer section of the front axle are shown on a larger scale, the outer end of auxiliary housing 54 is provided with an enlarged ball portion 61, having a lubricant filler fitting 62. Tightly fitted in aligned bores in ball portion 61 are a pair of bushings 63, in which the novel trunnion assemblies of the invention are journalled in the manner to be now described. The spindle and wheel assembly is carried by a hollow housing 64 of generally cylindrical form, having aligned openings 65 and 66 provided at its top and bottom respectively.

Tightly fitted in upper opening 65 is the pilot portion 67 of a cap member 68 having an integral steering arm 69. Cap 68 has a flange 71 seating against a circular boss 72 on housing 64 and is detachably secured thereto by cap screws 73. A tie rod arm 70 projects from the rear side of housing 64 and carries a stop screw assembly 70a, which coacts with stop member 56 to limit swinging movement of the spindle.

As seen in Figure 3, cap member 68 is provided with an opening 75 providing a comparatively long bearing surface in which a hardened, high strength trunnion pin 76 is tightly fitted. The friction fit between trunnion pin 76 and the cap is preferably so great as to make it unnecessary to employ a key or other means for fastening it in place. The fitting of the pin in place is preferably carried out by "freezing" the trunnion pin in dry ice, to cause it to contract, and to then insert it in an opening in the cap just large enough to receive it, and the temperatures then permitted to normalize. This effects an extremely rigid connection between the cap and pin. It is to be particularly observed that the trunnion pin extends entirely through the cap, with the result that the latter firmly supports the pin throughout its length, and adequately resists the shearing load to which it is subjected in operation, since the stresses are uniformly distributed along the pin and high unit pressures avoided.

The pin is also preferably provided with a tapped opening 77 into which a lubricant fitting of any well known character may be screwed, for supplying lubricant through a longitudinal passage 78 and a communicating cross-passage 79, to the working or journalled portion of the pin in bushing 63.

Member 68 is also provided with an accurately formed thrust bearing face 81, which coacts with a similarly formed face 82 on housing 54. If after assembling the mechanism a clearance exceeding 15 thousandths of an inch is found to exist between faces 81 and 82, a number of shims 83 are preferably inserted to bring the clearance or end play within this range.

Snugly fitted within lower opening 66 of housing 64 is the piloting portion 85 of a lower cap 86, which is provided with a flange 87 secured to a flat face 88 on housing 54 by means of a plurality of cap screws 89. A lower trunnion pin 91 is tightly secured in an opening 92 in cap 86 in a manner similar to that described in connection with the upper trunnion, and is also provided with passages 93, 94 and 95, through which lubricant may be fed to the portion of the pin journalled in bushing 63.

Cap 86 is also provided with a recess or counterbore 97 in which the lower race 98 of a roller thrust bearing 99 is seated. Upper race 101 and lower race 98 of the bearing are maintained in assembled relationship by a retainer 102, and the latter seats against a flat bearing face 103 provided on housing 54.

From the foregoing it is apparent that I have devised a novel trunnion and spindle mounting which makes it possible to employ a housing 54 of inexpensive material, for instance, cast malleable, such as National No. 6, can be successfully used and yet trunnion pin failures avoided, while thrust bearing 99 takes substantially the entire thrust load, facilitating steering. Also, the use of plain bearings simplifies and reduces the size of the parts to such an extent as to make it entirely feasible to employ an inverted Elliot trunnion assembly of sufficiently small size to make possible the use of a spindle so dimensioned as to take a hub interchangeable with the hub of the rear axle.

The space between the spindle housing and stationary housing 54 is sealed by a boot 105, secured at its inner and outer margins in grooves 106 and 107, provided in housings 64 and 54, respectively. The boot illustrated is more fully disclosed and claimed in United States Letters Patent No. 2,362,456 issued November 14, 1944, and will not be further described. The invention provides an improved device for guarding against injury to the boot, comprising a member 108 having an annular portion seating against flange 87 of cap 86, and secured under the heads of cap screws 89. Member 108 is also provided with an upwardly curving finger 108', which overlies the lower portion of the boot and adequately protects it against injury.

Secured to a bolting face 109 on spindle housing 64, which is preferably so inclined with respect to the trunnion axis as to impart a predetermined degree of camber to the spindle, is the flange 111 of a tubular spindle 112, by means of cap screws (not shown). By reason of the large diameter spindle housing 64 and the close coupled relationship of the parts provided by the novel plain bearing trunnion assembly of the invention, spindle 112 may be given such dimensions that the hub, as well as many of the other parts of the front axle, are interchangeable with corresponding parts of the rear axle, as will hereinafter appear.

The novel interchangeable hub 113 of the invention is journalled on a pair of spaced antifriction roller bearings 114 and 115. As seen in Figure 3, bearing 115 has an inner race 116 seating on a large diameter portion of the spindle, and an outer race 117 located in the hub and seating against a shoulder 118. Bearing 114 has an inner race 119 seating on a reduced diameter portion of the spindle, but, as seen in Figure 3, it is considerably thicker than race 116 of bearing 115, so as to compensate for the difference in spindle diameters and make it possible to utilize an outer race 121 of the same diameter as outer race 117 of bearing 115. Outer race 121 is carried in a seat in the hub and bears against an internal flange 122. Internal flanges 118 and 122 are preferably spaced the same distance from the ends of the hub, and the bearing seats in the hub are of the same diameter, so as to render the hub reversible upon the spindle for interchangeable installation in the rear axle.

The hub is driven from axle shaft 36 by means of a universal joint 124 located in the ball portion of housing 54 and a stub shaft 125, to which is splined a cap member 126, having a sleeve portion 126' extending inwardly between the wall of spindle 112 and shaft 125. The latter is retained on the shaft by a split ring 127 sprung into a groove at the end of the shaft and seating in a recess in the cap. A compression spring 128, reacting against the inner end of the cap sleeve 126' and acting against a seal 129 and a shoulder 131 on the shaft, constantly urges shaft 125 inwardly. While the spring is sufficiently strong to prevent endwise float of the shaft under normal conditions, it will yield under sufficiently high thrusts and permit endwise movement of the shaft assembly to avoid binding and possibly damaging the parts.

Cap 126 is provided with a piloting flange 132, which snugly fits a piloting surface 133 in the hub, and the cap is rigidly secured to the hub by a plurality of studs 134, threaded in the tapped openings 135 in the hub, and nuts 136.

A plurality of exactly similar and matching tapped openings 137, disposed the same distance from the hub axis, are located in the opposite end of the hub. Also, a similar internal surface 138, corresponding to surface 133, is provided in the other end of the hub, and carries a flanged element 139 cooperating with a lubricant seal 141, the latter being clamped between bearing race 116 and a shoulder on the spindle. Also fitting into surface 138 is a grease slinger 142.

Hub 113 is also provided with an external bolting flange 144, offset from hub centerline 147 unequal distances 145 and 146 from the ends of the hub, for the purpose of adapting it for either front or rear axle installations. Wheel piloting surfaces 148 and 149, located either side of flange 144, provide for interchangeable installation of the hub in the rear axle, to establish proper tracking of the wheels, as will be hereinafter explained.

Secured to a plurality of circumferentially spaced studs 151 anchored in flange 144, by means of nuts 152, are a brake drum 153 and a wheel 154, the latter being accurately piloted on pilot surface 148. As seen in Figure 3, centerline 155 of the wheel rim lies closely adjacent the inner face of the spindle flange 111, and the axis of the trunnion pins, when projected, lies slightly inside the inter-section of the rim centerline 155 with the ground for facilitating steering in well known manner.

Secured to the spindle flange by means of cap screws 157 is a lubricant receiving member 158 and a brake foundation plate 159. Member 158 is loosely telescoped over member 142 and is adapted to catch lubricant thrown therefrom and conduct it to a plurality of radial passages 161 provided in the spindle flange, and deliver it to a point outside of the brake foundation plate, thereby preventing it from reaching the brake shoes.

Foundation plate 159 is provided with a peripheral flange 162 fitting loosely into a groove 163 in the inner edge of the brake drum wall, for excluding extraneous material in well known manner. The brake mechanism comprises an anchor pin 164 secured in a boss 165 on the foundation plate and locked against rotation by a nut 166. The anchor pin is provided with an eccentric portion 167 on which a brake abutment member 168 is pivoted, the brake shoe actuating lever assembly having portions 169 and 171 secured in place on the anchor pin either side of abutment member 168. The novel axle assemblies of the invention make it possible to use the same brake in both the front and rear axles because in each instance a spindle is employed having bolt holes disposed the same distances from the shaft axis, and the internal arrangement of parts is such that when the hub is reversed and installed in the rear axle, it will locate the brake drum and wheel assemblies in the proper relationship to present the brake drum for proper coaction with the brake shoes, and also will locate the dual wheels of the rear axle in proper tracking relationship to the front wheels.

From the foregoing it is apparent that there is provided a thoroughly practical, efficient and rugged front drive axle of simple design, in which an inverted Elliot type spindle and trunnion assembly is utilized, and in which, by reason of the novel cap and hardened trunnion pin assembly, the required shear loads are adequately taken care of by means of plain bearings in the housing ball, and at the same time the construction permits extremely close coupling of the parts and utilization of a spindle designed to permit use of a hub interchangeable with the front and rear axles. Also, the novel trunnion assembly makes it possible to use inexpensive material for the ball and auxiliary housings, and yet the construction provides as much or more load carrying capacity, and is just as durable as the more expensive constructions embodying tapered roller bearings and expensive alloy housings heretofore proposed.

The rear axle of the invention will now be described, and since many of the parts are of identical size and shape of corresponding parts in the front axle, in order to simplify the disclosure, and to also clearly illustrate the interchangeability of the various parts, the same reference characters, with the subscript "a," will be applied to the parts of the rear axle which correspond to, and which are interchangeable with, the parts of the front axle.

Referring to Figures 1 and 2, rear axle housing 27a is disposed in the same relationship to the frame as the front axle, namely with the bowl portion 29a disposed to the same side of the longitudinal centerline of the vehicle, but in this instance carrier 25a is bolted to the front face 31a of the housing, (the carrier being turned around in a horizontal plane without inversion) to dispose ring gear 34a to the left of the centerline of propeller shaft 22, with the result that the latter, through universal joint 24a and pinion 33a, will propel the vehicle forwardly when propeller shafts 22 and 23 are rotated in the direction indicated by the arrows in Figures 1 and 2. In the rear axle cover 32a is bolted to rear bowl face 26a. The rear axle is provided with long and short axle shafts 181 and 182, which fit into the carrier assembly 25a in the same manner as the shafts of Figure 1, but they are not interchangeable therewith for reasons that will hereinafter appear.

Each rear axle spring 12 is bolted to seat 38a by U-bolts or clips passing through openings 49a and 51a, the spring being centered over opening 42a to locate it closer to the outer end of the axle (as seen in Figure 10) than in the front axle. There is no need to shim up the spring pads because the 2° 30′ inclination thereof does not result in a tilt of the axle sufficient to adversely affect operation thereof.

Referring to Figures 8, 9 and 10, the rear wheel and hub assemblies are journalled in rear axle spindle 183 each of which is provided with a flange 184 secured to bolting face 53a of the rear axle housing by stud and nut assemblies 55a and 57a in a manner similar to the front end assemblies there being no stop bracket under the nuts.

With particular reference to Figure 8, hub 113a is journalled in bearings 114a and 115a on the spindle in a manner similar to the hub of the front axle, except that it has been reversed end-for-end, so as to dispose its flange 144a inwardly or to the right of the centerline 147a of the hub, the brake drum 153a and dual wheels 154a being secured in place on the flange in a manner similar to the corresponding elements of the front axle. The bearings 114a and 115a are also reversed in position with respect to flange 114 of Figure 3. It is noted in Figure 2 that the centerline 165 of the dual wheel assembly is disposed directly in line with the centerline of the single wheel of the front axle, thus securing proper tracking of the wheels. This is achieved by reversing the hub and flange, as just discussed, and also by giving spindle 183 the proper overall axial length with respect to bolting flange 53a of the center axle housing section. If it is desired to employ single rather than dual wheels on the rear axle the hubs may be installed without reversing them end-for-end with respect to the front axle hubs.

Since brake drum 153a and wheels 154a cooperate with piloting surface 149a of the hub in exactly the same manner as in the front axle, they are fully interchangeable with the front axle wheels and brake drums. Inversion of the hub as just described of course makes it necessary to secure studs 134a in openings 137a of the hub rather than openings 135a. Axle shaft 182 is provided with a flange 190 having openings matching those of cap 126 of the front axle assembly and is secured in place in the same manner by nuts 136a.

The brake foundation plate 159a is secured by means of rivets 187 to a flange 188 on the spindle, and since the brake mechanism is similar to and interchangeable with the corresponding front axle brake, similar reference characters have been applied thereto. Also secured under the heads of the rivets 187 is a modified member 189 for receiving lubricant thrown from slinger 142a and adapted to divert it from the interior of the brake drum in a manner similar to the corresponding element 158 of the front axle. A somewhat different form of lubricant receiver is made necessary in the rear axle because of the somewhat greater axial spacing of the bolting flange from the end of hub 113a.

From the foregoing detailed disclosure of the invention it is apparent that front and rear drive axles of novel construction are provided embodying center sections which may be readily utilized to build up either front steer drive axles or rear non-steering drive axles by substitution of steering or non-steering end assemblies, and that by reason of the construction of the end assemblies, many of the parts of one end assembly are interchangeable with corresponding parts of the other, thereby materially reducing manufacturing costs and servicing difficulties, it only being necessary to stock a minimum number of parts to service either front or rear drive axles, and that aside from spindle 183, axle shaft 182, and member 189, all the elements of the rear axle are freely interchangeable with the corresponding elements of the front axle.

While I have illustrated the invention as being applied to a four wheel drive vehicle, it is to be understood that it is equally applicable to six wheel drive vehicles. For instance, a second rear axle, identical with the one illustrated, may be installed behind the one shown and be driven in any well known manner. Also, if desired, the center housing section of the second rear axle may be rotated through 180° in a horizontal plane so as to offset the bowl to the other side of the vehicle centerline. Moreover, while bevel type gear carriers have been shown, it is to be understood that worm gear, double reduction or other gear carriers may be used without departing from the spirit of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, a spindle; a pair of spaced bearings on said spindle; a hub having a pair of seats equidistantly spaced from its ends receiving said bearings and an external bolting flange to which a wheel assembly is adapted to be secured, said flange being offset from the center of said hub and said hub having a wheel assembly piloting face at each side of said flange; a drive shaft rotatable in said spindle; means for coupling said shaft to said hub, comprising a flange abutting one end of said hub and secured thereto by means of a plurality of elements threaded in bores in said hub end; said pilot faces of the hub being of the same diameter, and the other end of said hub having a set of threaded bores matching those of said one end, whereby said hub may be reversed end-for-end on said spindle to locate said bolting flange at the other side of the center of said hub.

2. The drive axle defined in claim 1, wherein said spindle is mounted for steering movements on a stationary housing, and said hub is journalled thereon with said bolting flange disposed outwardly of the center of said hub.

3. The drive axle defined in claim 1, wherein said spindle is rigidly secured to a stationary housing and said hub is journalled thereon with said bolting flange disposed inwardly of the center of said hub.

4. In a drive axle, a spindle, a hub journalled on spaced anti-friction bearings on said spindle, said hub extending inwardly of the inner of said bearings and having an inwardly facing annular wall; means cooperating with the latter and said spindle for sealing the space between said hub and spindle; an inwardly directed slinger seating in said annular wall to receive lubricant leaking past said seal; and a grease receiving member overlapping the periphery of said slinger, and adapted to receive lubricant thrown therefrom and condut it away from said spindle.

5. For use in a drive axle, a hollow hub of generally cylindrical form terminating at its ends in bolting faces disposed normal to its axis; each hub end having a plurality of threaded bores opening onto the respective bolting faces, the axes of said bores being equidistant from the hub axis; an external wheel bolting flange disposed intermediate the ends of said hub; and a cylindrical wheel piloting surface on said hub at each side of said flange.

6. The axle hub structure defined in claim 5, wherein said sub is provided with a pair of internal bearing seats disposed equidistant from said bolting faces, and said wheel bolting flange is disposed closer to one bolting face than the other.

7. In a vehicle drive, a wheel supporting spindle, a rotatable drive shaft therein, a wheel hub having wheel assembly attaching means laterally spaced from a vertical plane bisecting the hub at right angles to its axis, means providing a reversible end-for-end rotatable mounting of the wheel hub on said spindle, whereby the wheel assembly attaching means thereof may be selectively located at one or the other side of said vertical plane, and means for rigidly connecting the drive shaft to said hub.

8. The vehicle drive defined in claim 7 in which said hub mounting means comprises anti-friction bearings interchangeably mounted in opposite ends of the hub.

9. The vehicle drive defined in claim 7 in which the wheel assembly attaching means comprises a flange peripherally circumscribing said hub and a piloting surface for the wheel assembly at each side of said flange.

10. The vehicle drive defined in claim 7 in which said connecting means between the wheel hub and drive shaft includes a common connecting member for both positions of the hub on said spindle.

11. In a vehicle drive, a front steering wheel supporting spindle, a rear rigid wheel supporting spindle, a rotatable drive shaft in each of said spindles, said front and rear spindles having wheel hub mounting portions of identical external configuration, front and rear wheel carrying hubs, each of said hubs having means providing an interchangeable, reversible end-for-end rotatable mounting of the wheel hubs on the rear and front wheel supporting spindles, respectively, and means for rigidly connecting each of the drive shafts to one of the wheel hubs.

12. The vehicle drive defined in claim 11, in which the mounting means for each wheel hub comprises anti-friction bearings interchangeably mounted in the opposite ends of the hub.

LAWRENCE R. BUCKENDALE.